US009447315B2

(12) United States Patent
Fernandez et al.

(10) Patent No.: US 9,447,315 B2
(45) Date of Patent: Sep. 20, 2016

(54) ELECTROPHILIC ACID GAS-REACTIVE FLUID, PROPPANT, AND PROCESS FOR ENHANCED FRACTURING AND RECOVERY OF ENERGY PRODUCING MATERIALS

(71) Applicants: Carlos A. Fernandez, Kennewick, WA (US); David J. Heldebrant, Richland, WA (US); Alain H. R. Bonneville, Richland, WA (US); Hun Bok Jung, Richland, WA (US); Kenneth C. Carroll, Las Cruces, NM (US)

(72) Inventors: Carlos A. Fernandez, Kennewick, WA (US); David J. Heldebrant, Richland, WA (US); Alain H. R. Bonneville, Richland, WA (US); Hun Bok Jung, Richland, WA (US); Kenneth C. Carroll, Las Cruces, NM (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 203 days.

(21) Appl. No.: 14/477,700

(22) Filed: Sep. 4, 2014

(65) Prior Publication Data
US 2015/0060068 A1  Mar. 5, 2015

Related U.S. Application Data

(60) Provisional application No. 61/873,646, filed on Sep. 4, 2013.

(51) Int. Cl.
| C09K 8/594 | (2006.01) |
| E21B 43/26 | (2006.01) |
| C09K 8/80  | (2006.01) |
| C09K 8/68  | (2006.01) |

(52) U.S. Cl.
CPC ............. *C09K 8/805* (2013.01); *C09K 8/68* (2013.01); *E21B 43/26* (2013.01); *Y10T 428/2982* (2015.01)

(58) Field of Classification Search
None
See application file for complete search history.

(56) References Cited

U.S. PATENT DOCUMENTS

| 9,328,590 B2* | 5/2016 | Vorderbruggen ....... E21B 43/04 |
| 2008/0073082 A1* | 3/2008 | Thiercelin ............. E21B 33/138 166/280.1 |
| 2008/0108524 A1* | 5/2008 | Willberg ................ C09K 8/035 507/225 |
| 2014/0262295 A1* | 9/2014 | Aines .................... E21B 43/267 166/308.2 |
| 2015/0000985 A1* | 1/2015 | Zhou ..................... C09K 8/512 175/65 |
| 2016/0102243 A1* | 4/2016 | Abasiattai ............. E21B 43/267 166/308.1 |
| 2016/0137912 A1* | 5/2016 | Sherman ................ C09K 8/805 166/280.2 |

OTHER PUBLICATIONS

Blackwell, D. D., et al., Assessment of the Enhanced Geothermal System Resource Base of the United States, Natural Resources Research, vol. 15, No. 4, 2006, 283-383.

(Continued)

*Primary Examiner* — Angela M DiTrani
*Assistant Examiner* — Andrew H Sue-Ako
(74) *Attorney, Agent, or Firm* — James D. Matheson

(57) ABSTRACT

An electrophilic acid gas-reactive fracturing and recovery fluid, proppant, and process are detailed. The fluid expands in volume to provide rapid and controlled increases in pressure that enhances fracturing in subterranean bedrock for recovery of energy-producing materials. Proppants stabilize openings in fractures and fissures following fracturing.

11 Claims, 10 Drawing Sheets

(56) References Cited

OTHER PUBLICATIONS

Pruess, K., Enhanced geothermal systems 9EGS) using CO2 as working fluid—A novel approach for generating renewable energy with simultaneous sequestration of carbon, Geothermics, 35, 2006, 351-367.
Kargbo, D. M., et al., Natural Gas Plays in the Marcellus Shale: Challenges and Potential Opportunities, Environmental Science & Technology, 44, 2020, 5679-5684.
Kerr, R. A.Natural Gas from Shale Bursts Onto the Scene, Science, 328, 2010, 1624-1626.
Jang, B. N., et al., The relationship between thermal degradation behavior of polymer and the fire retardancy of polymer/clay nanocomposites, Polymer, 46, 2005, 10678-10687.
Wang, J., et al., Continuous Kinetics for Thermal Degradation of Polymer in Solution, Aiche Journal, 41, 1995, 1521-1533.
Garcia-Ochoa, F., et al., Xanthan gum: production, recovery, and properties, Biotechnology Advances, 18, 2000, 549-579.
Gallup, D. L., Production engineering in geothermal technology: A review, Geothermics, 38, 2009, 326-334.
Carretti, E., et al., Soft matter and art conservation. Rheoversible gels and beyond, Soft Matter, 2005, 1, 17-22.
Jessop, P. G., et al., CO2-triggered switchable solvents, surfactants, and other materials, Energy & Environmental Science, 5, 2012, 7240-7253.
Han., D., et al., Two-Way CO2-Switchable Triblock Copolymer Hydrogels, Macromolecules,, 1, 2012, 57-61.
Guo, Z., et al., A novel smart polymer responsive to CO2, Chemical Communications, 47, 2011, 9348-9350.
Carretti, E., et al., Rheoreversible Polymeric Organogels: The Art of Science for Art Conservation, Langmuir, 20, 2004, 8414-8418.
Heldebrant, D. J., et al., Reversible zwitterionic liquids, the reaction of alkanol guanidines, alkanol amidines, and diamines with CO2, Green Chemistry, 12, 2010, 713-721.
Hoyt, D. W., et al., High-pressure magic angle spinning nuclear magnetic resonance, Journal of Magnetic Resonance, 212, 2011, 378-385.
Turcu, R. V. F., et al., Rotor design for high pressure magic angle spinning nuclear magnetic resonance, Journal of Magnetic Resonance, 226, 2013, 64-69.
Carretti, E., et al., Synthesis and Characterization of Gels from Polyallylamine and Carbon Dioxide as Gellant, Journal of the American Chemical Society, 125, 2003, 5121-5129.
Nagai, D., et al., Synthesis of Hydrogels from Polyallylamine with Carbon Dioxide as Gellant: Development of Reversible CO2 Absorbent, Macromolecular Rapid Communications, 32, 2011, 404-410.
Pinto, M. L., et al., Adsorption and Activation of CO2 by Amine-Modified Nanoporous Materials Studied by Solid-State NMR and 13CO2 Adsorption, Chemistry of Materials, 23, 2011, 1387-1395.
Carretti, E., et al., New Frontiers in Materials Science for Art Conservation: Responsive Gels and Beyond, Accounts of Chemical Research, 43, 6, 2010, 751-760.

* cited by examiner

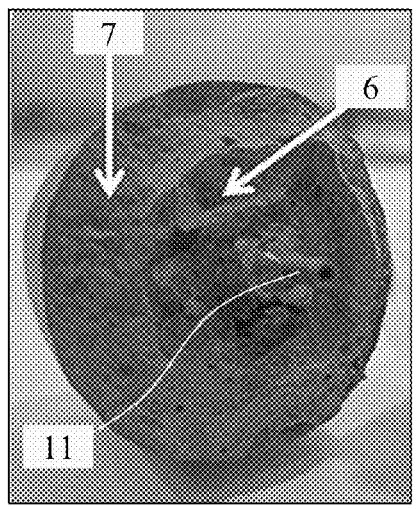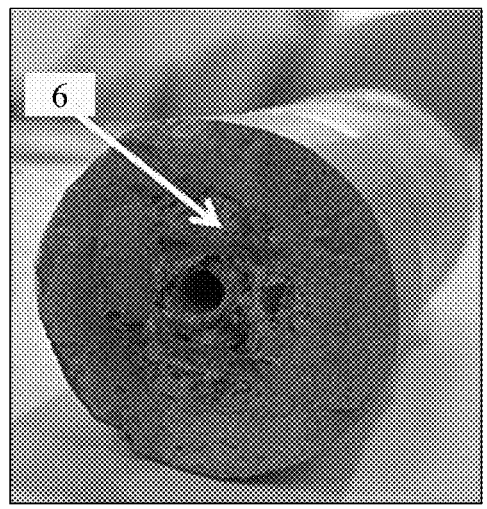
FIG. 6A  FIG. 6B
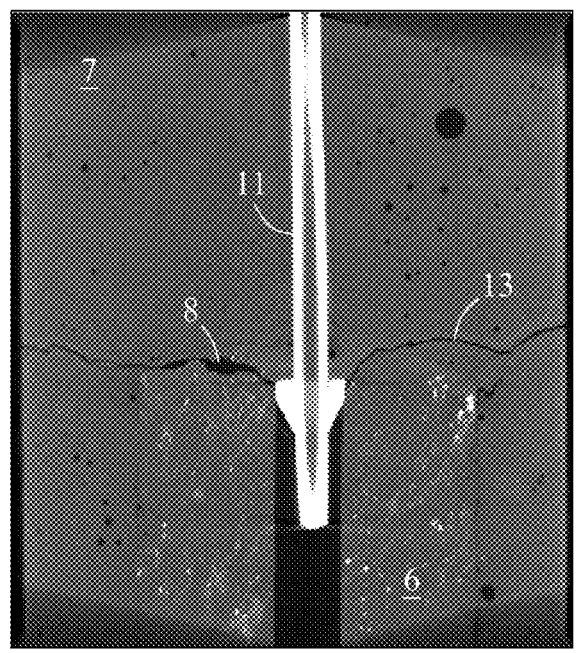
FIG. 7

ELECTROPHILIC ACID GAS-REACTIVE FLUID, PROPPANT, AND PROCESS FOR ENHANCED FRACTURING AND RECOVERY OF ENERGY PRODUCING MATERIALS

CROSS REFERENCE TO RELATED APPLICATION

This is a non-provisional application that claims priority from U.S. Provisional Application No. 61/873,646 filed 4 Sep. 2013, which reference is incorporated in its entirety herein.

STATEMENT REGARDING RIGHTS TO INVENTION MADE UNDER FEDERALLY-SPONSORED RESEARCH AND DEVELOPMENT

This invention was made with Government support under Contract DE-AC05-76RLO-1830 awarded by the U.S. Department of Energy. The Government has certain rights in the invention.

FIELD OF THE INVENTION

The present invention relates generally to fracturing systems and processes. More particularly, the present invention relates to an electrophilic acid gas reactive fracturing fluid, proppant, and process that provide enhanced fracturing and recovery of energy producing materials from subterranean reservoirs.

BACKGROUND OF THE INVENTION

The urgent need for energy from cost-effective renewable energy sources is well recognized. Enhanced Geothermal Systems (EGS) and some hydrocarbon recovery systems rely on engineered reservoirs, bores, or wells introduced into the earth surface to recover energy producing materials from beneath the earth's surface including geothermal water, geothermal heat, hydrocarbon gases, and/or petroleum. However, recovering energy-producing materials from subterranean bedrock or shale rock beneath the earth's surface is not easily achieved currently or in a cost-effective or efficient manner due to a lack of permeability in the native bedrock at depths, e.g., between about 3 km to about 10 km. Furthermore, bedrock must be extensively fractured to provide necessary heat exchange or to provide accessibility for fluid volumes at flow rates that sustain EGS and some hydrocarbon recovery systems. However, to date, EGS systems have yet to attain sustainable flow rates, production rates, and/or yields needed for economic viability. Technological advances could render EGS systems viable for energy production within the US and worldwide and address untold energy needs in the future.

Hydraulic fracturing is a process of forcing a fracturing liquid under pressure into the reservoir to fracture subterranean shale rock or bedrock and introduce fissures or openings that allow energy-producing materials to be extracted and recovered. Hydraulic fracturing employs millions of gallons of water per well. Pressurized fracturing liquids may include various chemical modifiers that when injected at high pressure into the open fissures in the bedrock enhance the properties of the fracturing liquid and, in the case of unconventional hydrocarbon recovery systems, assist the recovery of oil and gas when released from the shale rock or bedrock. For example, modifiers including petrochemicals, surfactants, and macropolymers may be introduced in a fracturing fluid to modify the rheological properties of the bedrock or shale rock to promote fracturing of the bedrock, a process called "stimulation". Chemical modifiers can modify or adjust the viscosity of the fracturing fluid, enhance performance of the fracking fluid, or otherwise increase the accessibility of the fracturing fluid into the bedrock or shale rock. Fractures and fracture-induced fissures introduced into the bedrock are held open during or following the fracturing treatment by injecting a proppant such as sand, ceramics, or bauxite in the fracking fluid. Addition of proppants allows petroleum and hydrocarbon gases such as methane ($CH_4$) gas or other recovered energy-producing materials to diffuse or flow out of fractures and fissures into the reservoir for recovery. In EGS, proppants allow the working fluid to flow at a desired rate which allows heat to be extracted. However, well-known problems exist with conventional fracking fluids. For example, proppants including sand and other solid particulates degrade pumping components and piping over time reducing equipment lifetimes. Proppant particles can also constitute a high volume fraction of the fracturing fluid that can increase the density of the fracturing fluid. Highly viscous fluids or gels are often required to transport the dense proppants through the reservoir into the bedrock. Dense and heavy proppants when introduced can cause excessive loads on injection pumps and increase costs for pumping. In addition, chemicals introduced in fracturing fluids can leach into aquifers and contaminate the ground water or deleteriously impact the environment where reservoirs are located. Others can be carcinogenic or can include explosives or other high-energy compounds that themselves are problematic or otherwise require extreme or careful handling. Further, fracturing fluids developed for oil/gas recovery may not be applicable for geothermal recovery due to the fact that temperatures greater than 150° C. can degrade process chemicals. Finally, injected chemical additives and drilling mud can also be physically difficult to remove from the bedrock formation once a new fracture front is formed resulting in decreased flow rates and decreased heat transfer. Accordingly, new fracturing fluids, proppants, and processes are needed that enhance fracturing, permeability, and/or recovery of energy producing materials at high temperature and high pressure conditions. The present invention addresses these needs.

SUMMARY OF THE INVENTION

The present invention includes a new electrophilic acid gas reactive fracturing and recovery fluid, proppant, and process that provide enhanced fracturing in subterranean bedrock and shale rock for enhanced recovery of energy-producing materials. The electrophilic acid gas-reactive fracturing fluid may include: an electrophilic-acid-gas-reactive compound in an aqueous solvent, in an organic solvent or multiple solvents, or an aqueous solvent including at least one organic solvent. The fracture and recovery fluid may further include a proppant. The proppant may include a plurality of solid particles of a selected size. The solid particles may include a surface that is functionalized with an electrophilic-acid-gas reactive compound of a selected molecular weight. The electrophilic acid gas-reactive proppant maintains fracture and fissure openings in bedrock and shale rock in the subterranean reservoir.

The present invention also includes a process for fracturing subterranean bedrock for recovery of the energy-producing material. The process may include introducing a fracturing fluid into the reservoir that includes an electrophilic-acid-gas-reactive compound in selected solvents including an aqueous solvent, an organic solvent or multiple organic solvents, or an aqueous solvent including at least one organic solvent. The fracturing fluid contacts bedrock or shale rock at a selected depth or location beneath the earth's surface. The fluid containing the reactive compound may then be contacted with an electrophilic acid gas at a selected gas pressure and temperature that chemically expands the fluid to a volume greater than about 1 times. The expanded fluid exerts a pressure in the bedrock above a minimum differential pressure in-situ that propagates fractures and fissures in the bedrock that enhances recovery of energy-producing materials into the reservoir. The term "minimum differential pressure" means a pressure above the threshold pressure that initiates propagation of fractures and fissures in the subterranean bedrock.

Electrophilic acid gases may be selected from: $CO_2$, $CS_2$, COS, $SO_2$, $SO_3$, $NO_x$, including combinations of these acid gases.

Electrophilic-acid-gas-reactive compounds include, but are not limited to, e.g., polyamines, polyallylamines, polyimines, polyanilines, polyacrylamines, polyamides, polyacrylamides, polyaminosiloxanes, polyaminosilicones, chitosan, amino acids, amino acid derivatives, polyamidines, polyguanidines, monomers thereof, oligomers thereof, polymers thereof, and combinations thereof.

The fracturing and recovery fluid containing the electrophilic acid gas reactive compound may be gelled at selected temperatures and pressures to displace and recover energy-producing materials from the subterranean reservoir. In some applications, the fracturing and recovery fluid may gel at temperatures selected up to about 400° C. or higher and electrophilic acid gas pressures up to about 300 atm (3.04E+04 kPa) or higher. In some applications, the fracturing and recovery fluid may gel at temperatures selected between about 20° C. to about 400° C. or higher. In some applications, the fracturing and recovery fluid may gel at temperatures selected between about 180° C. to about 400° C. or higher.

The fracture and recovery fluid may undergo a chemically-derived expansion in volume greater than about 1 times when contacted by an electrophilic acid gas at a selected pressure and temperature in a subterranean reservoir. The expanded fluid may exert a fluid pressure in the subterranean bedrock above a minimum differential stress in-situ that propagates fractures and fissures that enhances permeability for recovery of energy-producing materials from the subterranean bedrock. In some applications, the fluid propagates fractures at a differential pressure at or above about 10 bar and a temperature at or above about 20° C. In some applications, the fluid propagates fractures at a differential pressure selected in the range between about 10 bar (1.0E+03 kPa) to about 1100 bar (1.1E+05 kPa), and at a temperature between about 20° C. to about 400° C., or greater. In some applications, the fluid propagates fractures at a minimum differential pressure of at least about 1 bar (1.0E+02 kPa) above the hydrostatic pressure upon expansion in the reservoir.

The fracture and recovery fluid may include a concentration of the electrophilic acid gas-reactive compound in either solvent of from about 0.1 wt % up to the limit of solubility as a function of temperature, or greater.

The fracture and recovery fluid may also include a chemical compound that releases the electrophilic acid gas needed for expansion of the fluid in the subterranean reservoir. The chemical compound that forms the electrophilic acid gas needed for expansion of the fluid may include a bicarbonate salt.

Viscosity of the fracture and recovery fluid in the subterranean reservoir may be selected in concert with selected quantities of the electrophilic acid gas. In some applications, viscosity of the fracture and recovery fluid may be at least about 15 cP. In some applications, viscosity of the fracture and recovery fluid may be below about 15 cP. Electrophilic gas pressures and fluid temperatures are not limited.

Proppants of the present invention may include solid particles that include a functionalized surface containing an electrophilic-acid-gas reactive compound. Solid particles may include selected materials including, but not limited to, e.g., ceramics, sand, bauxite, diorite, other natural minerals, other natural resin-coated minerals, and combinations of these various materials. In some applications, the solid particles may include a size at or below about 5 mm on average, but are not limited. In some embodiments, the functionalized surface may include a molecular weight of less than about 17,000 Daltons. In some embodiments, the functionalized surface may include an electrophilic-acid-gas reactive compound with a molecular weight between about 17,000 Daltons to about 900,000 Daltons. In some embodiments, the functionalized surface may include an electrophilic-acid-gas reactive compound with a molecular weight greater than about 900,000 Daltons. In some embodiments, the functionalized surface may include an electrophilic-acid-gas reactive compound with a molecular weight between about 30 Daltons to about 900,000 Daltons.

Proppants with the functionalized surface containing the electrophilic acid gas reactive compound may be in the form of an external liquid or solid shell that is hydrophilic, hydrophobic, or amphiphilic.

Proppants with the acid gas-reactive compound may include a dispersibility in the reservoir that is up to about 50% greater compared with a proppant absent the functionalized surface.

Proppants with the acid gas-reactive compound may include a density between about −20% to about +400% of the density of the fracturing and recovery fluid without the proppant.

Proppants with the acid gas-reactive compound may include a concentration in the fracturing and recovery fluid up to about 5 lbs./gal (0.6 kg/L).

Proppants with the acid gas-reactive compound when contacted by an electrophilic-acid-gas in the subterranean reservoir release the solid particles which forms aggregates of the solid particles that stabilizes openings of fractures and fissures in the reservoir.

Proppants with the acid gas-reactive compound when contacted by an electrophilic-acid-gas in the reservoir release the acid gas-reactive compound that chemically expands the fluid in subterranean bedrock in-situ that propagates fractures and fissures for recovery of energy-producing materials.

Proppants with the acid gas-reactive compound when contacted by an electrophilic-acid-gas in the reservoir release the acid gas-reactive compound which chemically expands the fluid in subterranean bedrock by a volume greater than about 1 times in-situ that propagates fractures and fissures for recovery of energy-producing materials.

Viscosity of the fracturing and recovery fluid is adjustable. Viscosity of the fracturing fluid in the reservoir may be changed to enhance recovery of energy-producing materials in the subterranean reservoir. Viscosity of the fracturing fluid in the reservoir may also be changed to recover energy-producing materials from the reservoir. Parameters that adjust the viscosity may include: a change in temperature, a change in acid gas pressure, a change in pH, a change in concentration of the electrophilic acid-gas reactive compound, and combinations of these parameters.

The purpose of the foregoing abstract is to enable the United States Patent and Trademark Office and the public generally, especially scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

FIGS. 6A-6B are photographs showing different views of a subterranean bedrock core sample fractured in simulated high temperature and high pressure conditions with the fracturing fluid of the present invention.

FIG. 7 is an X-ray tomography (XRT) micrograph showing a cross-sectional view of the bedrock core sample of FIG. 6 fractured in accordance with the present invention.

DETAILED DESCRIPTION OF THE INVENTION

Figure 1A:
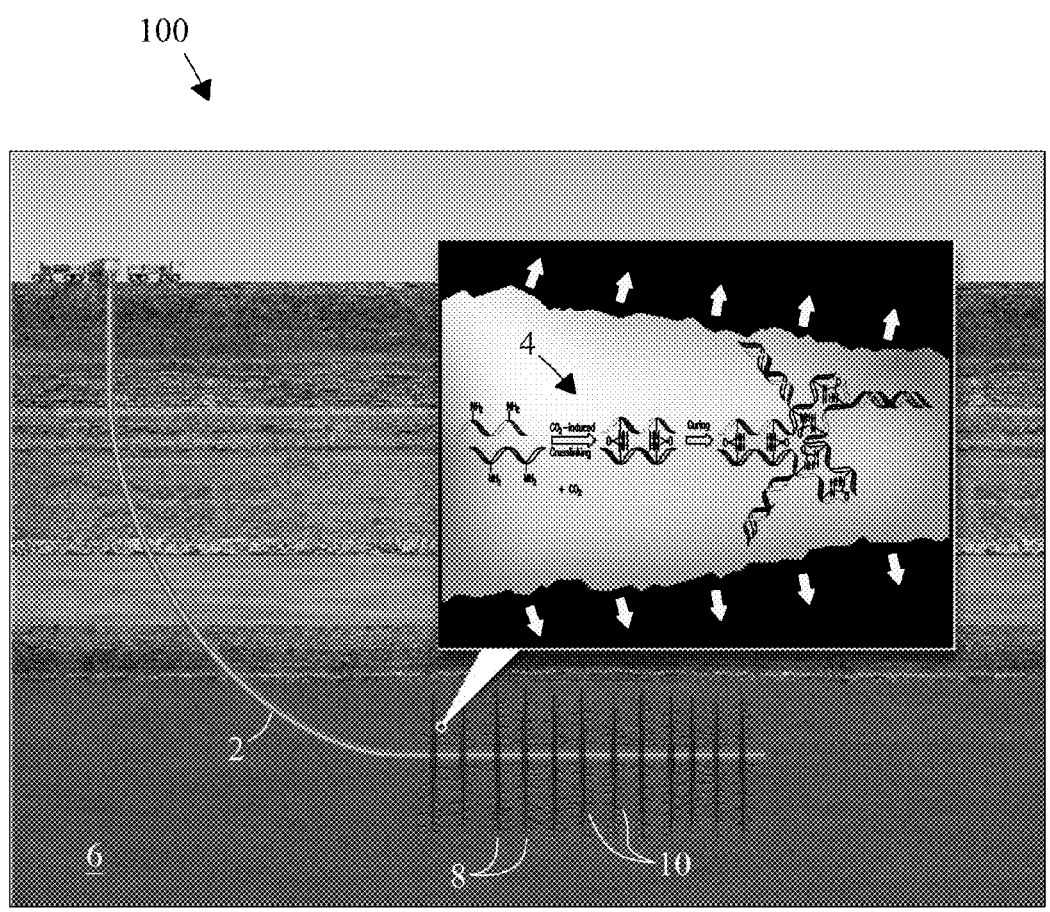
FIGS. 1A-1B illustrate processes for enhanced fracturing and recovery of energy-producing materials in accordance with the present invention.

A system, fluid, proppant, and process are disclosed for enhancing fractures within shale and bedrock within a subterranean reservoir that enhances recovery of energy-producing materials from the reservoir. In the following description, embodiments of the present invention are shown and described by way of illustration of the best mode contemplated for carrying out the invention. It will be clear that the invention is susceptible of various modifications and alternative constructions. It should be understood that there is no intention to limit the invention to the specific forms disclosed, but, on the contrary, the invention is intended to cover all modifications, alternative constructions, and equivalents falling within the spirit and scope of the invention as defined in the claims. Therefore the description should be seen as illustrative and not limiting. FIG. 1A illustrates an exemplary process 100 for enhanced fracturing of subterranean bedrock or shale rock 6 at a selected depth that enhances recovery of energy-producing materials including, e.g., hydrocarbon gases and petroleum into a reservoir 2. The process may include introducing a fracturing and recovery fluid 4 into subterranean reservoir 2 that includes an electrophilic-acid-gas-reactive compound dissolved or disbursed in an aqueous solvent, in an organic solvent or organic solvents, or in an aqueous solvent that includes one or more organic solvents. Fracturing and recovery fluid 4 may be introduced into reservoir 2 as a non-viscous fluid at a selected pressure. The fluid may include a low surface tension, e.g., between about 5 mN/m to about 60 mN/m or a shear-thinning property that allows the fluid to readily flow. Temperature, lithostatic (overburden) pressure, and hydrostatic pressure conditions in the reservoir can vary with depth. For example, in the U.S., temperature and lithostatic or hydrostatic pressure values may range from 30° C. and 3000 psi (206.8E+02 kPa) at a depth of 2000 feet (ft) (914 m) up to 140° C. and 17,000 psi (117.2E+03 kPa) at 15,000 ft (4572 m), and in EGS from about 150° C. and 3000 psi (206.8E+02 kPa) to about 370° C. and 15,000 psi (1.03E+05 kPa). When introduced into reservoir 2 under hydraulic pressure, fluid 4 penetrates subterranean bedrock or shale rock 6 at a selected depth or location of reservoir 2. Once in contact with bedrock 6, an electrophilic acid gas may be introduced to activate the acid-gas reactive compound. When contacted by an electrophilic acid gas at the selected depth in the reservoir, the fracturing fluid gas-reactive compound in the fluid chemically reacts with the electrophilic acid gas. The fluid undergoes a chemical expansion that increases the viscosity and the volume of the fluid. The fluid volume expands by a factor greater than about 1 times in the constrained environment of the subterranean bedrock at the depth of the reservoir. Crosslinking (curing) of the acid-gas reactive compound in the fluid may lead to formation of a solid porous gel (e.g., a carbamate) at the high subterranean pressures and temperatures. The fluid in any of its chemical forms whether viscous fluid or solid gel may exert a fluid pressure above a minimum differential pressure in the bedrock in-situ, which propagates fractures 8 and fissures 10 that enhance permeability of bedrock 6 for recovery of energy-producing materials into reservoir 2. The porous gel form of the fluid allows shale gases to diffuse through the porous gel into the reservoir 2 for recovery while leaving the gel entrained in fractures 8 and fissures 10 produced in bedrock 6.

Activation of electrophilic acid-gas reactive compounds may include any source of electrophilic acid gases including compounds or solutions that release the electrophilic acid gas or that react to produce the electrophilic acid gas that then activates and initiates the crosslinking (curing) reactions of the gas-reactive compound in the fracturing fluid and the resulting expansion in volume of the fracturing fluid.

In some embodiments, the electrophilic acid gas may be introduced into the reservoir after introducing the fracturing and recovery fluid. In some embodiments, the electrophilic acid gas may be co-delivered with the fracturing and recovery fluid that chemically reacts with the fluid at the high pressures and temperatures in the reservoir. In yet other embodiments, the fracturing fluid may also include an activation compound that generates the electrophilic acid gas at the selected fluid pressure in the reservoir that may then react with the acid gas-reactive compound in the fluid at the selected depth in the reservoir. In some embodiments, the activation compound may be a bicarbonate salt (e.g., NaHCO$_3$). In some embodiments, the bicarbonate may be dissolved in the fracturing fluid. In some embodiments, the bicarbonate may be co-delivered with the fracturing fluid in a solution, or may be delivered following introduction of the fracturing fluid in a solution that then generates and releases the electrophilic acid gas at the selected depth in the reservoir. The bicarbonate salt may react at the temperature and pressure at the selected depth in the subterranean reservoir to form sodium carbonate ($Na_2CO_3$), $H_2O$, and $CO_2$. The $CO_2$ when formed and released may then react with, and activate, the gas-reactive compound in the fracturing fluid that initiates the fluid expansion that fractures the bedrock or shale rock in the reservoir.

Solvents suitable for use include, but are not limited to, e.g., water, alkanes (e.g., hexane), alkenes, alkynes, chloroform, ethers, haloalkanes, esters, ketones, aldehydes, alcohols, aqueous solvents containing one or more organic solvents, and combinations of these various solvents.

Electrophilic acid gases suitable for use in concert with the present invention may be selected from: $CO_2$, $CS_2$, COS, $SO_2$, $SO_3$, $NO_x$, and combinations of these various gases.

Electrophilic acid gas reactive compounds suitable for use may include, but are not limited to, e.g., amine-containing monomers and polymers including, but not limited to, e.g., polyamines; polyallylamines; polyimines [e.g., poly(ethyleneimine)]; polyanilines; polyacrylamines; polyamides; polyacrylamides; polyaminosiloxanes such as polydimethylsiloxanes; polyaminosilicones; chitosans; amino acids; amino acid derivatives such as polylisines (e.g., polylisine hydrobromide); polyamidines; polyguanidines; including combinations of these various compounds. Concentrations of these various compounds in the fluid are not intended to be limited. Concentration of electrophilic acid gas-reactive compounds in the fracturing fluid may be up to the limit of solubility of the compound in the selected solvent at the selected operation conditions or greater. For example, as will be appreciated by those of ordinary skill in the art, at geothermal conditions in the subterranean reservoir, varying temperature and pressure conditions may allow greater concentrations of the gas-reactive compound to be soluble in the fracturing fluid. Thus, no limitations are intended. In some embodiments, concentration of the electrophilic acid gas-reactive compound in the fluid may be up to about 20 wt %. In some embodiments, concentration of the gas-reactive compound in the fluid may be from about 0.1 wt % to about 20 wt %. In some embodiments, concentration of the gas-reactive compound in the fluid may be between about 1 wt % to about 5 wt %.

Figure 1B:
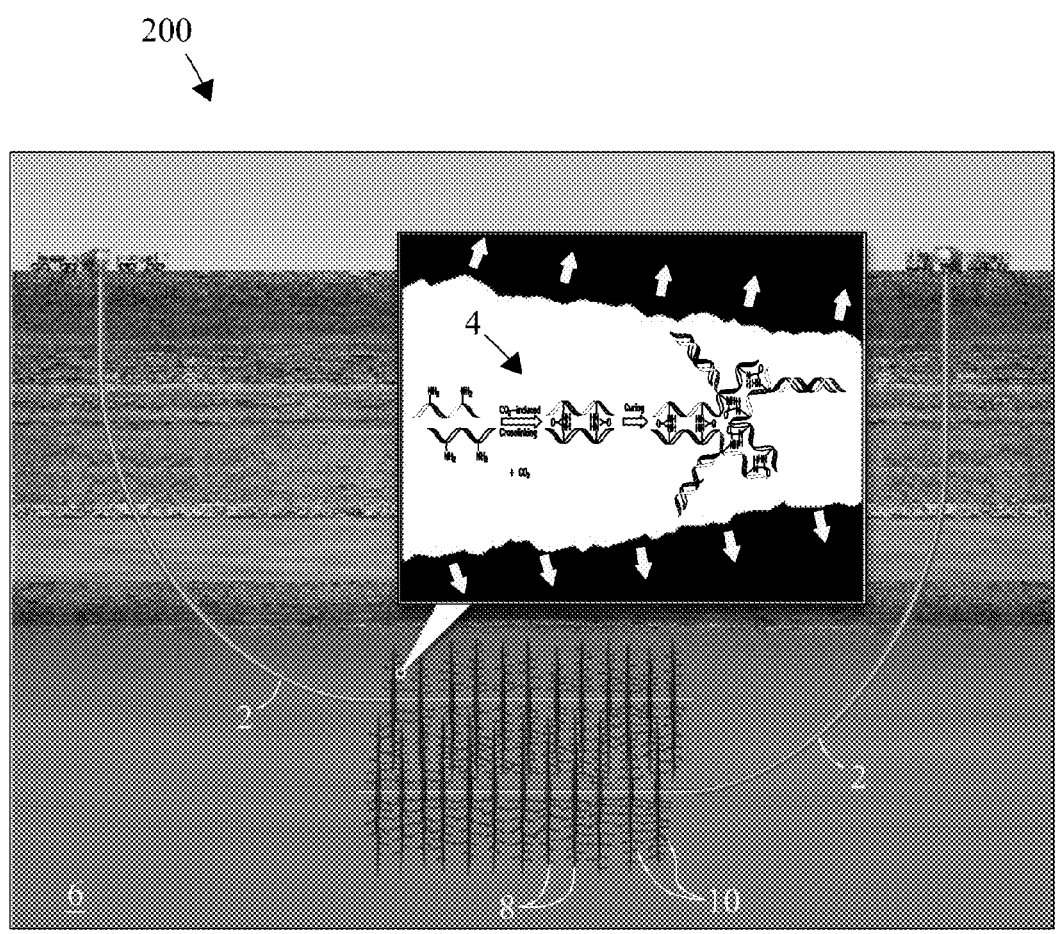

FIG. 1B illustrates another exemplary process 200 of the present invention for enhanced fracturing of subterranean bedrock or shale rock 6 at a selected depth that enhances recovery of energy-producing materials including, e.g., geothermal energy-producing materials such as geothermal water and geothermal heat into a reservoir 2. The process described previously in reference to FIG. 1A may be repeated at a depth suitable for recovery of geothermal energy-producing materials. The process may include introducing a fracturing and recovery fluid 4 into subterranean reservoir 2 that includes an electrophilic-acid-gas-reactive compound. When introduced into reservoir 2, fluid 4 penetrates subterranean bedrock or shale rock 6 at a selected depth or location of reservoir 2. Fluid 4 in any of its chemical forms whether viscous fluid or solid gel may exert a fluid pressure above a minimum differential pressure in the bedrock in-situ, which propagates fractures 8 and fissures 10 that enhance permeability of the bedrock 6 for recovery of energy-producing materials into reservoir 2. As shown in the figure, one or more reservoirs 2 may be employed. In some embodiments, two or more reservoirs or bore wells may be connected. One bore well (i.e., the injection well) may inject cold water into the subterranean reservoir. Another bore well (i.e., the production well) may collect hot water/vapor. In some embodiments, e.g., for oil and gas recovery, a single reservoir may serve as both the injection well and as the production well when the fracturing fluid is removed, which allows oil to flow to the surface.

Fracturing in concert with the present invention may be performed at various subterranean depths between about 500 ft (152.4 m) to about 15,000 ft (4.57E+03 m). However, no limitations are intended. All depths as will be selected by those of ordinary skill in the fracturing art are within the scope of the present invention.

The present invention allows rapid yet controlled increases in pressure that enhance fracturing of the subterranean bedrock. In some embodiments, expansion of the fracturing and recovery fluid may be controlled by maintaining control over the rate and/or pressure at which electrophilic acid gases are introduced into, or generated within, the reservoir.

Figure 2:
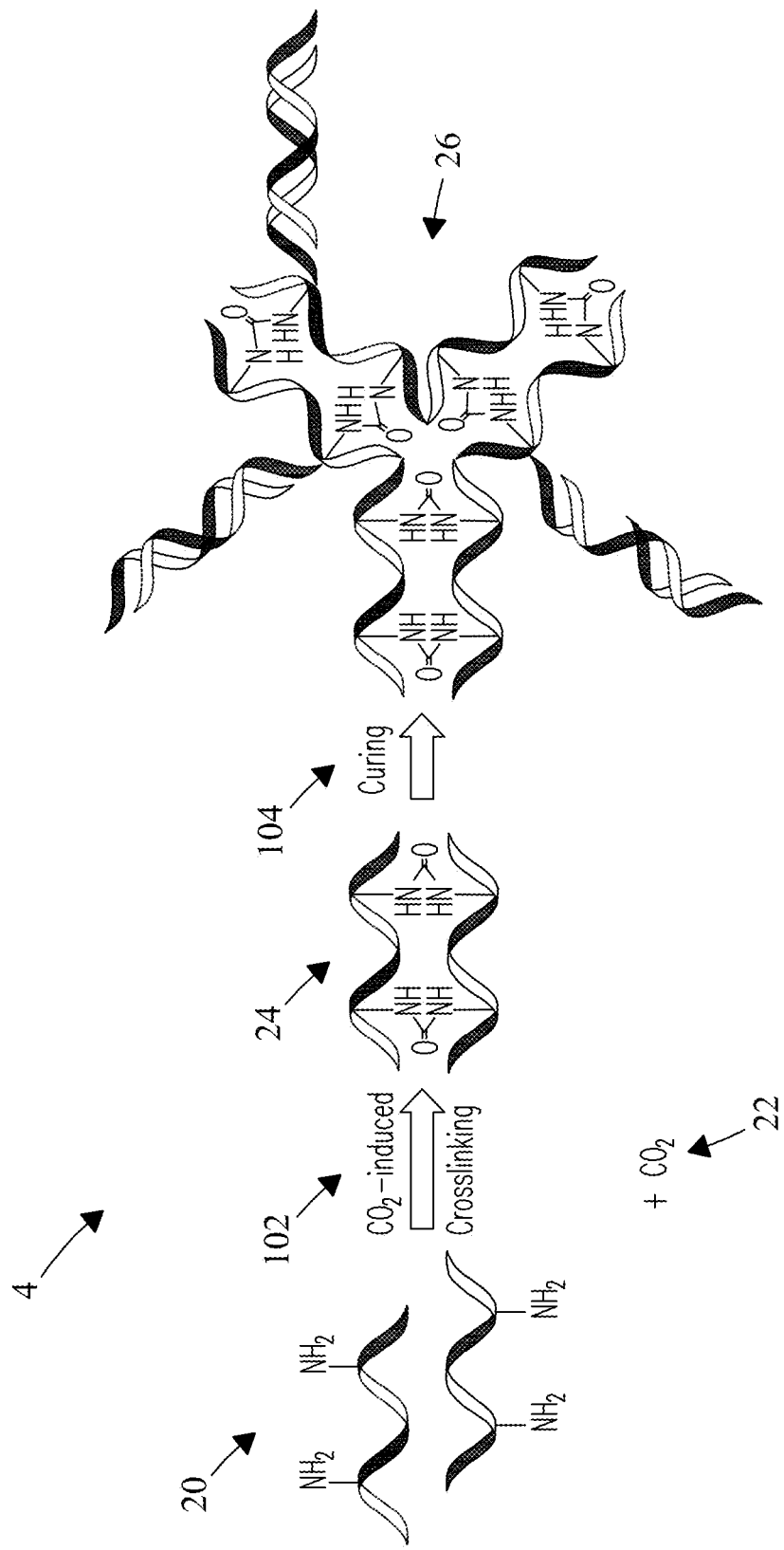
FIG. 2 illustrates a reaction between an exemplary electrophilic-acid reactive compound with an electrophilic-acid gas in accordance with the present invention.

FIG. 2 illustrates chemical reactions in an exemplary fracturing and recovery fluid 4 when contacted by an exemplary electrophilic acid gas, $CO_2$. In the figure, a reaction between an exemplary electrophilic-acid gas reactive compound polyallylamine (PAA) polymer 20 and a representative electrophilic-acid gas 22 (e.g., $CO_2$) is illustrated. When contacted by $CO_2$ 22, individual chains of PAA polymer 20 in fluid 4 begin to crosslink {102}. The formation of cross-linked polymers 24 increases the viscosity of the fracturing fluid. Further crosslinking (curing) {104} rapidly increases the volume of the fracturing fluid and fully cures the polymer chains in the fluid. The fully cured polymer 26 in the fluid forms a solid hydrogel (e.g., a carbamate) at the maximum volume expansion of the fluid.

Volume Expansion

Figure 3A:
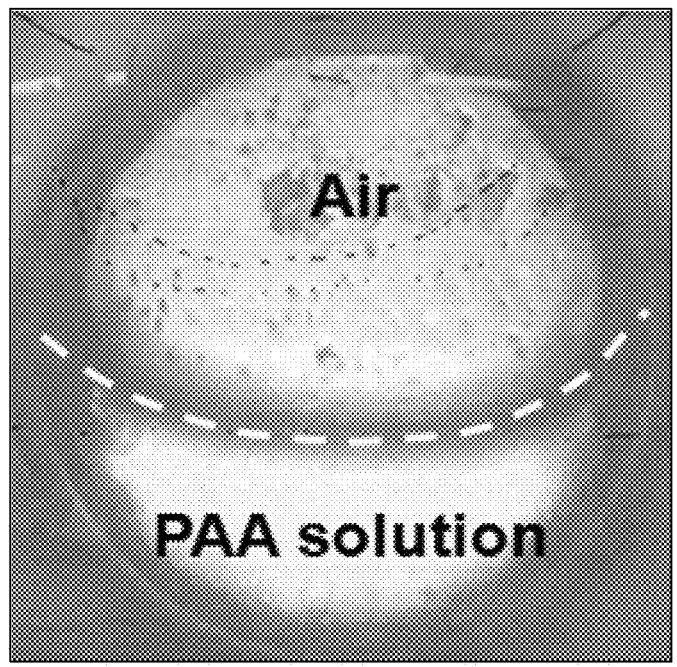
FIGS. 3A-3B are photographs showing a fracturing fluid containing an electrophilic-acid reactive compound in a solvent before and after reaction with an electrophilic-acid gas in accordance with the present invention.
Figure 3B:
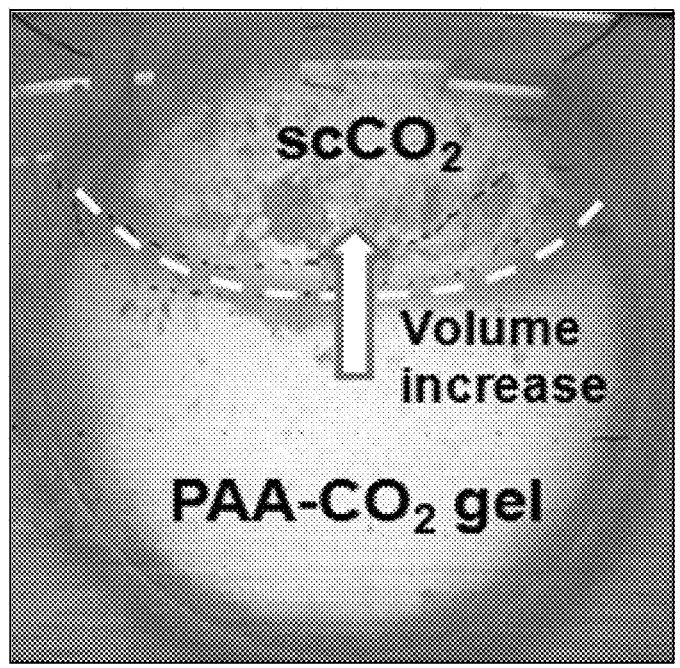

FIGS. 3A-3B show different views of a reaction cell filled with a representative fracturing fluid of the present invention containing PAA polymer (1 wt %) in an aqueous fluid before and after reaction with an exemplary electrophilic acid gas, $CO_2$. FIG. 3A shows the fluid before reaction with $CO_2$ gas. A large air space is observed in the reaction cell above the level of the PAA solution. FIG. 3B shows the fracturing fluid after reaction with $CO_2$ gas. The level of the fluid now in the form of a PAA-$CO_2$ hydrogel shows a substantial increase in volume compared to the reaction cell containing the unreacted fluid.

In various embodiments, volume expansion of the fracturing and recovery fluid containing the electrophilic acid gas-reactive compound may be greater than about 1 times.

In some embodiments, volume expansion of the fluid containing the electrophilic acid gas-reactive compound, e.g., in the hydrogel form, may be up to about 2 times or greater at temperatures between about 150° C. to about 390° C. and electrophilic acid gas pressures between about 100 atm (1.01E+04 kPa) to about 300 atm (3.04E+04 kPa).

MAS Spectra

Figure 4A:
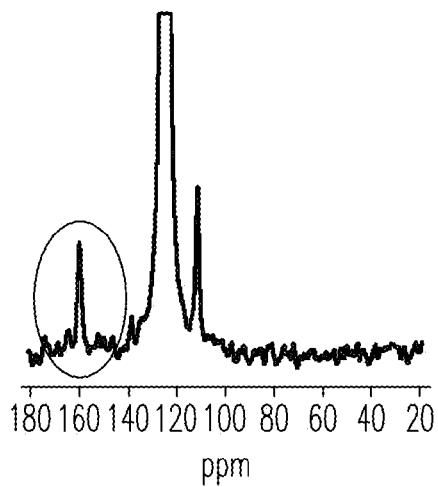
FIGS. 4A-4C present $^{13}$C-SP-MAS spectra showing progression of reactions in a fracturing fluid between an electrophilic-acid reactive compound and an electrophilic-acid gas in accordance with the present invention.
Figure 4B:
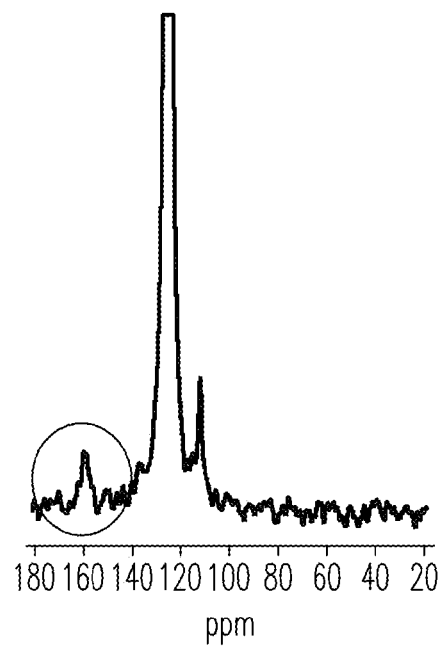
Figure 4C:
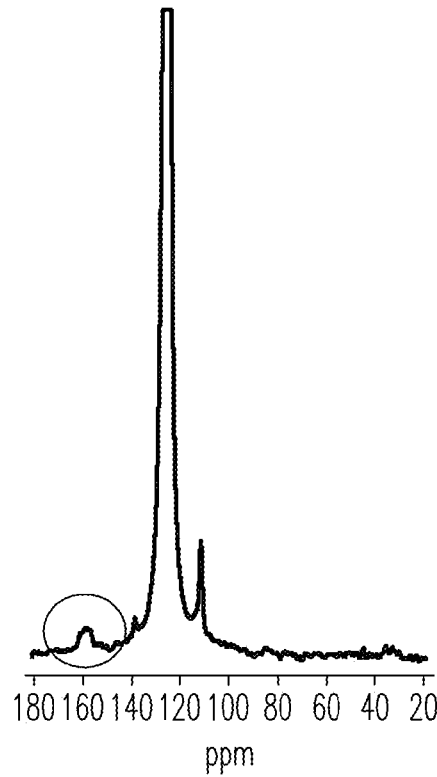

FIGS. 4A-4C present Magic Angle Spinning Nuclear Magnetic Resonance (MAS-NMR) spectra that show the progression of reactions between an exemplary electrophilic acid gas-reactive polymer, PAA, in the fracturing fluid and an exemplary electrophilic acid gas, $CO_2$. Here, a 1 wt % PAA solution was exposed to 10% $^{13}$C-labeled supercritical $CO_2$ (sc$CO_2$). Spectra were acquired in concert with $^1$H high power decoupling using a total of 120, 120 and 1000 scans, respectively, at a sample spinning rate of 1.0 kHz and a recycle delay time of 5 seconds. Carbon (C) chemical shifts were referenced using an external reference, adamatane (37.85 ppm). In FIG. 4A, the $^{13}C$ signal was collected at a temperature of 99° C. and a $CO_2$ pressure of 103 bar (1.03E+04 kPa). The spectrum shows a single sharp peak positioned at 161 ppm corresponding to presence of carbamic acid (formula: $H_2NCO_2H$), which forms as a first reaction product in the chemical reaction between the amine polymer PAA and $CO_2$ immediately prior to crosslinking reactions between the $CO_2$-reactive polymer. In FIG. 4B, the $^{13}C$ signal was collected at a temperature of 127° C. and a $CO_2$ pressure of 121 bar (1.21E+04 kPa). The original carbamic acid peak positioned at 161 ppm begins to shift outward toward the right and left into two separate conversion peaks, one peak positioned at 158 ppm corresponding to PAA bicarbonate (a product stemming from reaction of a carbamate salt with water), and a second peak positioned at 162 ppm corresponding to urea (a product stemming from condensation and crosslinking reactions between the bicarbonate and the carbamate salt). In FIG. 4C, the $^{13}C$ signal was collected at a temperature of 154° C. and a $CO_2$ pressure of 138 bar (1.38E+04 kPa). The spectrum shows continued progression of the crosslinking reaction that forms urea, as evidenced by overlapping peaks positioned at 158 ppm and 162 ppm.

Figure 5A:
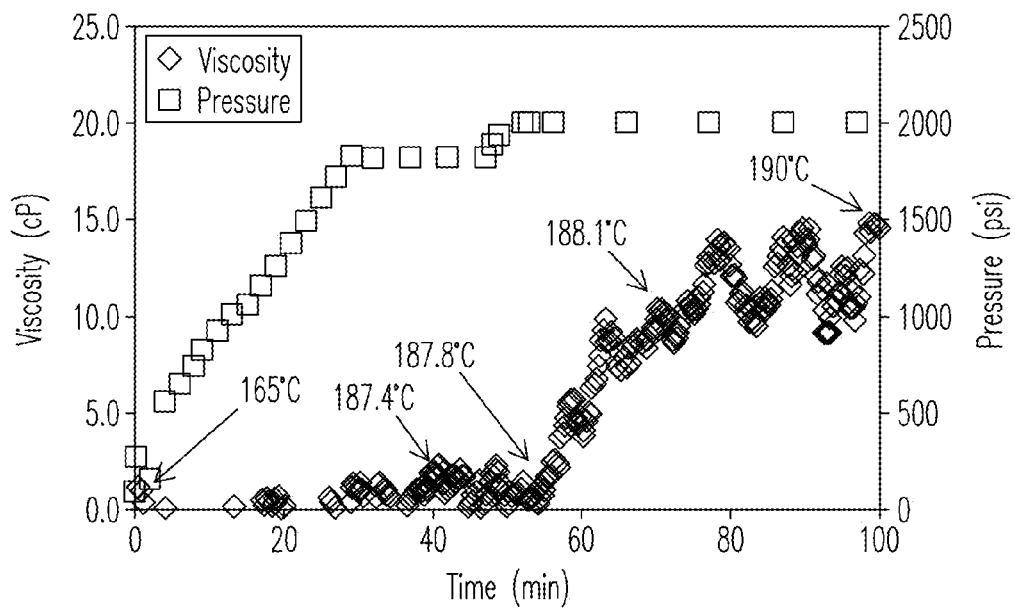
FIGS. 5A-5F compare viscosity and rheological properties for a fracturing fluid of the present invention against conventional fluids known in the art.
Figure 5B:
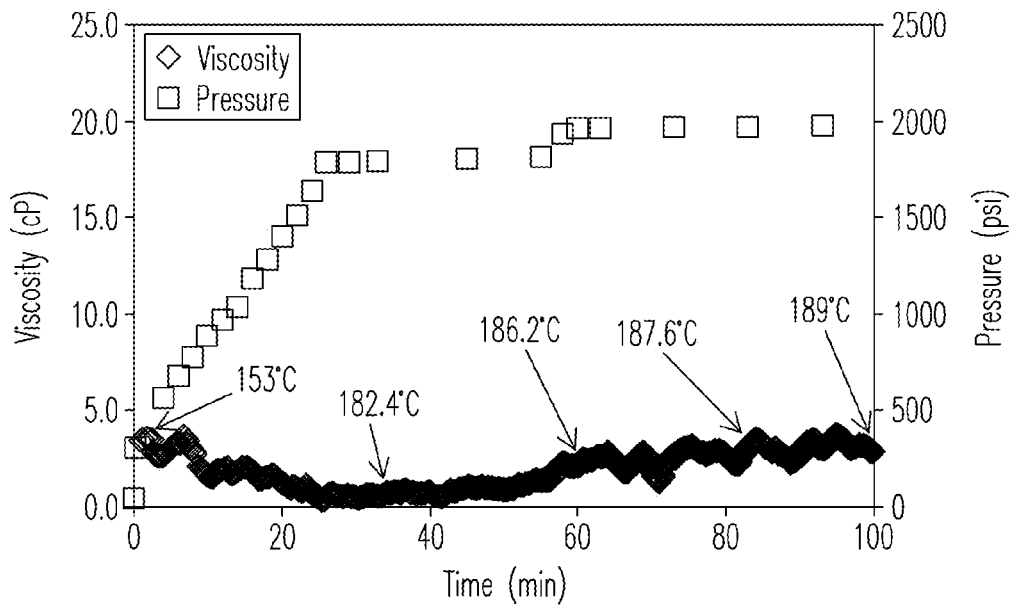
Figure 5C:
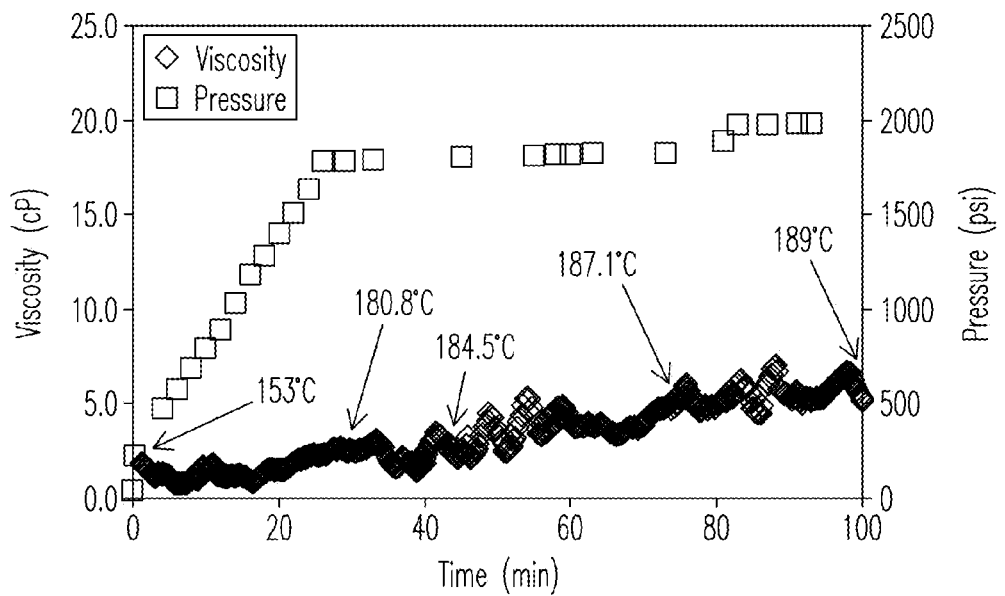

FIGS. 5A-5C compare viscosity for an exemplary fracturing fluid (1% PAA) of the present invention (FIG. 5A) as a function of time against two conventional fracturing fluids, a 0.1% xanthan gum solution (FIG. 5B), and a 1% sodium dodecyl sulfate (SDS) solution (FIG. 5C). In FIG. 5A, viscosity of the 1% PAA solution reaches 15 centipoise (cP) at a temperature of 190° C. and a $CO_2$ pressure of 2000 psi (1.38E+04 kPa). PAA shows a viscosity that is a factor of about 5 greater than that observed for the 0.1% xanthan gum solution in FIG. 5B, and a factor of about 3 greater than that observed for the 1% sodium dodecyl sulfate (SDS) solution in FIG. 5C at the same temperature and pressure conditions.

Electrophilic acid gas-reactive compounds of the present invention also provide a shear thinning property to the fracturing fluid, which is advantageous for hydraulic fracturing applications. The shear thinning property facilitates propagation of the fluid into fissure openings. And, as the fluid fills the fissures, viscosity increases due to the reduction in shear rate.

Figure 5D:
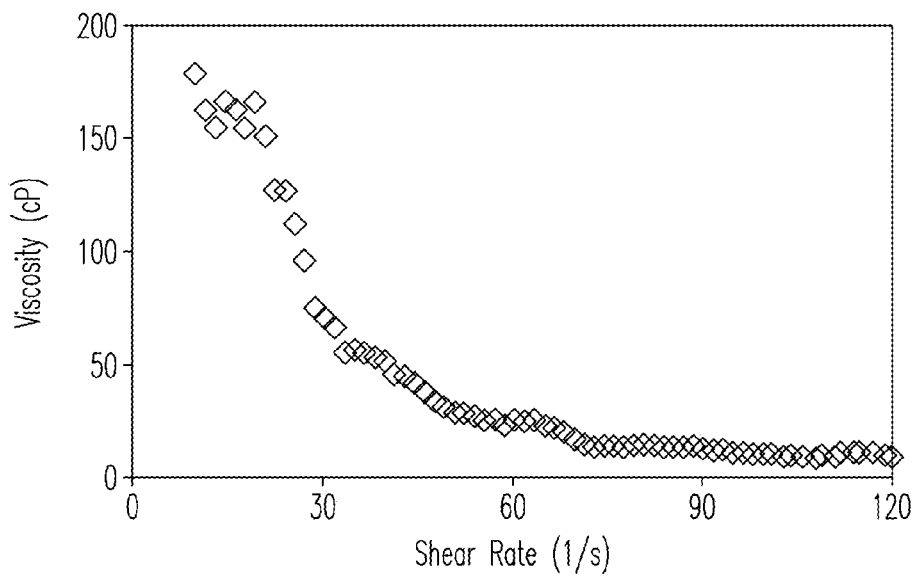
Figure 5E:
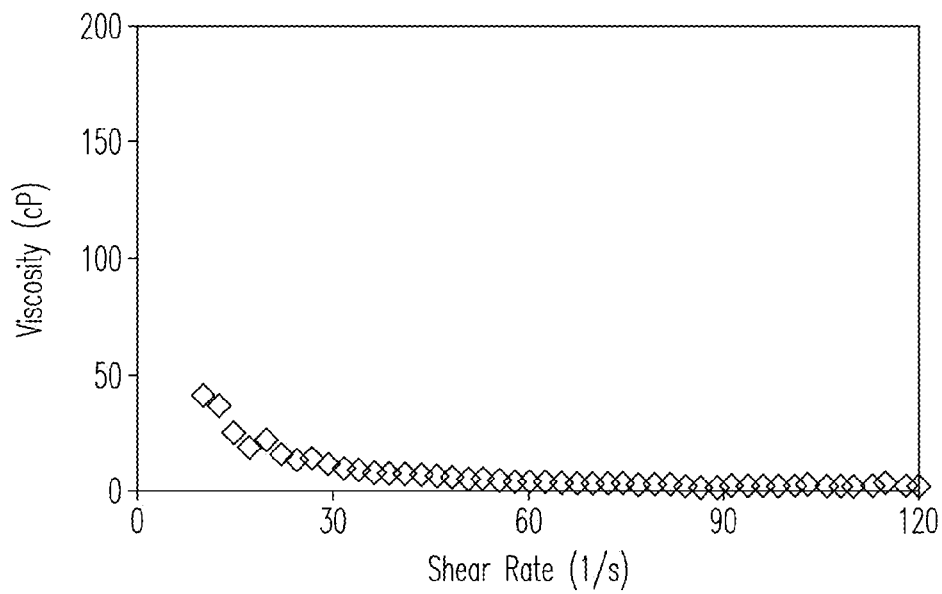
Figure 5F:
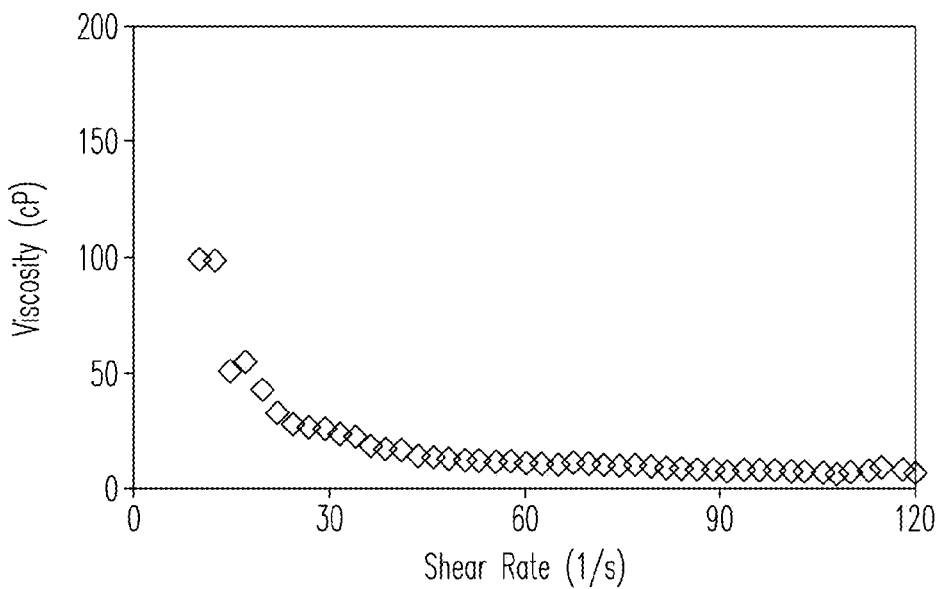

FIGS. 5D-5F compare viscosity for the exemplary fracturing fluid (1% PAA) of the present invention (FIG. 5D) as a function of shear rate against two conventional fracturing fluids, a 0.1% xanthan gum solution (FIG. 5E), and a 1% sodium dodecyl sulfate (SDS) solution (FIG. 5F). In FIG. 5D, the PAA solution exhibits the shear thinning property. Viscosity decreases as a function of increasing shear rate. At a shear rate of 120 $s^{-1}$, for example, viscosity decreases to below 10 cP. The conventional fluids do likewise as shown in FIG. 5E and FIG. 5F. However, at a shear rate below about 10 $s^{-1}$, viscosity of the PAA solution rises rapidly to a value nearly 5 times that of the xanthan gum solution and about 2 times that of the SDS solution. Viscosity and rheology differences of the present invention are significant as the viscous or gelled PAA polymer can readily adhere within fissures at the terminal location under static flow conditions due to the rapidly increasing viscosity, as compared to conventional fracturing fluids known in the art.

Fracturing of Core Sample

FIGS. 6A-6B show top and bottom views of a core sample recovered from a subterranean geothermal formation (e.g., Coso Geothermal Field, Inyo County, Calif., USA) containing actual shale rock 6 composed of the mineral Diorite fractured in concert with the present invention. The photograph shows the resulting top core section (FIG. 6A) and bottom core section (FIG. 6B) following treatment with the fracturing fluid. The recovered core sample was encased in a cement outer shell 7 to simulate confining pressures and temperatures, and permeability conditions in the geothermal formation. The core sample included a compressive strength of between about 1500 atm (1.52E+05 kPa) and about 2000 atm (2.03E+05 kPa) and a permeability (K) on the order of $10^{-6}$ millidarcies (mD).

An exemplary fracturing fluid of the present invention (1 wt % PAA solution in water) was introduced from the top of the core sample through a stainless steel tube 11 introduced through a bore hole into the core sample. The core was fractured at simulated high temperature (210° C.) and high pressure (270 atm) (2.74E+04 kPa) conditions. Conditions correspond to a depth of about 1500 meters in a typical EGS reservoir. The fracturing fluid broke the core sample in two halves at an effective (differential) pressure of only 7 atm (100 psi) (6.89E+02 kPa), and yielded a permeability in the core sample of 496 mD, which is nine orders of magnitude greater than the permeability of the original non-fractured core sample. Even at a differential pressure of 160 atm (2400 psi) (1.62E+04 kPa), conventional fracturing fluids such as aqueous SDS did not create or propagate fractures in the core samples.

FIG. 7 is an X-ray tomography (XRT) micrograph that shows a cross-sectional view of the shale rock core 6 sample of FIG. 6. The figure shows a stainless steel (316-SS) tube (1/16 inch bore) 11 inserted into the core about ⅓ of the distance from the top of the core sample down into the core sample. The fracturing fluid and the electrophilic acid gas (e.g., $CO_2$) were introduced through tube 11 into the core sample. Expansion of the fluid volume in contact with the electrophilic acid gas ($CO_2$) fractured the core sample. A fracture 8 in the shale rock core is observed immediately above the drilled bore near the top of the rock core sample. Another fracture 13 penetrated the outer cement shell 7. The rock core 6 fractured at a differential pressure of only 7 atm (7.09E+02 kPa) above the static pressure condition (e.g., 270 atm) (2.73E+04 kPa) at 210° C., or a total pressure of 277 atm (2.81E+04 kPa). Core samples did not fracture using conventional fluids including, e.g., 0.1 wt % xanthan gum and 1 wt % SDS even at differential pressures of 160 atm (1.62E+04 kPa) (i.e., a total pressure of 430 atm) (4.36E+04 kPa).

Electrophilic Acid Gas-Reactive Proppants

Figure 8:
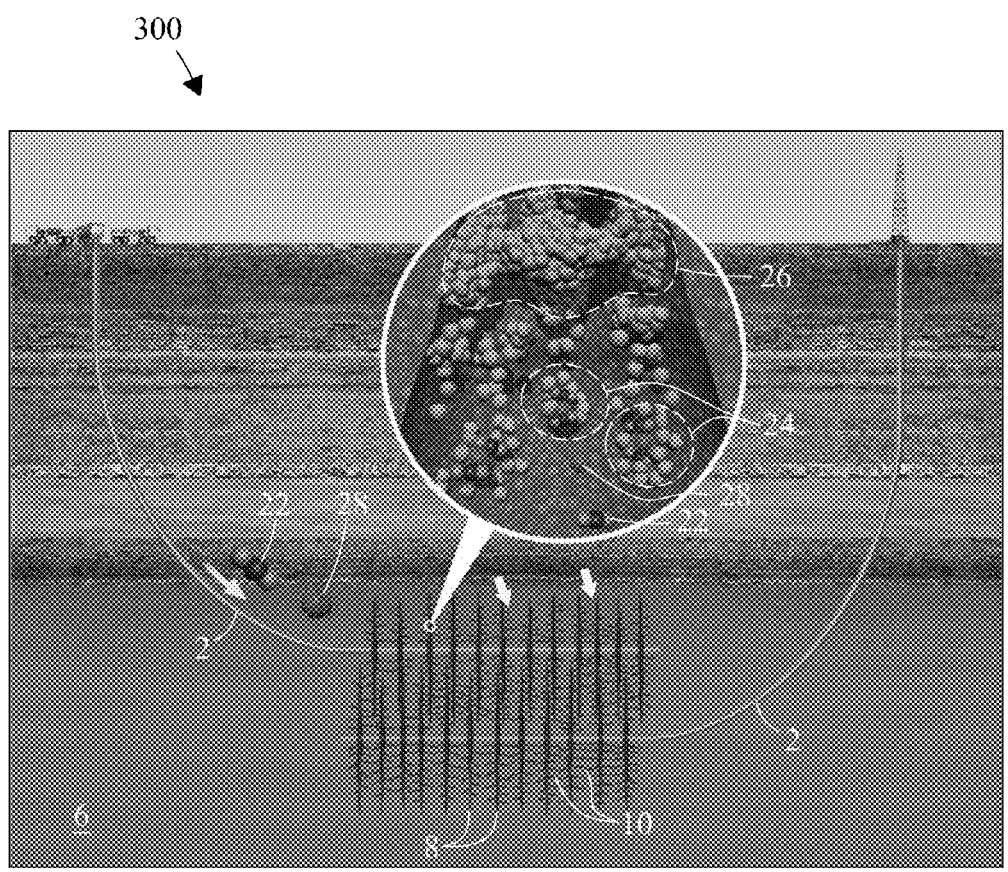
FIG. 8 illustrates a process for enhanced delivery of proppants in concert with the fracturing fluid of the present invention.

The present invention also includes electrophilic acid gas reactive proppants 28 that stabilize fractures and fissures in subterranean bedrock 6. FIG. 8 illustrates a process 300 for transport and implantation of proppants 28 of the present invention. Proppants 28 may be comprised of solid particles (not shown) composed of selected materials including, but not limited to, e.g., ceramics, sand, bauxite, diorite, other natural minerals, other natural resin-coated minerals, and combinations of these various materials. The solid particles may include various sizes. Particle sizes may be selected that keep the proppant dispersed in the fracturing fluid or another fluid. Fluids may include water, organic fluids, and aqueous fluids that include one or more organic fluids. In some embodiments, solid particles of the proppant may include a size at or below about 5 mm on average. However, sizes are not intended to be limited. The surface of the solid particles may be functionalized with electrophilic acid gas-reactive compounds described previously herein. In some embodiments, the functionalized surface of the proppant may be in the form of an external liquid shell or a solid shell. In various embodiments, the proppant containing the external liquid or solid shell may be hydrophilic, hydrophobic, or amphiphilic.

Proppant 28 with the functionalized surface may be introduced into reservoir 2 in an electrophilic acid gas-reactive fracturing fluid (not shown) or another separate or different fluid. When contacted by an electrophilic acid gas 22, proppant 28 may release the electrophilic acid gas reactive compound from the surface of the particles into the fracturing fluid present within the subterranean bedrock 6. Electrophilic acid gas 22 may further activate the acid gas-reactive compound in the fluid that chemically expands the fluid in fractures 8 and fissures 10 in-situ. In the figure, an exemplary electrophilic acid gas, $CO_2$ 22 in contact with an exemplary electrophilic acid gas reactive compound, e.g., PAA, forms cross-linked polymers 24 that increase the viscosity of the fracturing fluid. Further crosslinking of the PAA polymers rapidly increases the volume of the fracturing fluid and fully cures the polymer chains in the fluid. The fully cured polymer 26 in the fluid forms a solid hydrogel at the maximum volume expansion of the fluid. Expansion of the fluid propagates and enhances fractures 8 and fissures 10 and permeability in bedrock 6 for recovery of energy-producing materials, as described previously herein. Proppant 28 may further release the solid particles into fractures 8 and fissures 10 in the bedrock 6 that can form aggregates of solid particles that stabilize openings in fractures 8 and fissures 10 in subterranean bedrock 6.

In various embodiments, the functionalized surface of proppant 28 may include a selected molecular weight of the electrophilic-acid-gas reactive compound between about 30 Daltons to about 900,000 Daltons. However, the molecular weight is not intended to be limited.

Proppants of the present invention may have a dispersibility in the fracturing fluid that is up to about 50% greater compared with a proppant that does not include the functionalized surface. In various embodiments, the proppants may include a dispersibility between about 0.1 lbs./gal (0.02 kg/L) to about 5 lbs./gal (0.6 kg/L). Proppants may also include a density between about −20% to about +400% of the fluid density without the proppant. In some embodiments, proppants may also include a concentration in the fluid up to about 5 lbs./gal (0.6 kg/L).

The gas-reactive compound in the fracturing fluid exhibits favorable rheo-reversible behavior. For example, when first introduced into the reservoir, the gas-reactive compound in the fracturing fluid when contacted by the electrophilic acid gas proceeds from a non-viscous fluid to a viscous fluid and cures to a solid gel (or a mixture of a viscous fluid/solid gel) after full expansion. During recovery of the energy-producing material, the solid gel may proceed, e.g., to a viscous fluid and then to a non-viscous liquid.

In some embodiments, rheology of the fracturing fluid in the forward and reverse directions may be controlled by adjusting the pressure of the electrophilic acid gas in the reservoir. Rheoreversibity of the acid-gas reactive compound in the fracturing fluid facilitates removal of the fracturing fluids from the subterranean reservoir to the surface for recycling. For example, reversibility may return the gel form of the fluid in the bedrock fractures to the non-viscous fluid form to enhance flow rate and heat transfer of the fracturing fluid.

In some embodiments, recovery of the fracturing fluid may proceed by converting the solid gel form of the fluid to the non-viscous form of the fluid.

In some embodiments, recovery may proceed by converting the gel form of the fluid to the viscous form of the fluid.

In some embodiments, the solid gel form of the fracturing fluid may be converted into a viscous fluid or a non-viscous fluid by addition of an acid. The mild acid may dissolve the solid gel and return the gas-reactive compound or a selected quantity of the gas-reactive compound in the fluid into a water soluble surfactant. In some embodiments, the surfactant in the viscous form of the fluid can encapsulate residual hydrocarbons released into the subterranean reservoir and render them soluble in the fracturing fluid. The recovered hydrocarbons can then be brought to the surface in the viscous fluid, where both the hydrocarbons and the gas-reactive compound can be recovered.

The fracturing fluid and process of the present invention provide various advantages not provided by conventional fracturing fluids. The gas-reactive compound of the present invention expands in contact with a electrophilic acid gas, a benign activation or curing agent. The fracturing fluid is inexpensive, provides strong stimulation in the subterranean reservoir, reduces water usage, waste water needing treatment following use, reduces pumping time, and reduces other reservoir stimulation costs. The gas-reactive compound of the present invention may be recovered as a surfactant, which minimizes leaching of toxic or carcinogenic chemicals into aquifers or ground water which reduces or minimizes environmental impacts. Recyclability of the fracturing fluid also reduces operation costs as well as costs for modifiers and other additives.

EXAMPLES

The following examples provide a further understanding of various aspects of the present invention in its larger aspects.

Example 1

Rheological Properties of PAA

Rheological properties of a 1 wt % polyallylamine (PAA) solution, 0.1% xanthan gum solution, and 1 wt % SDS (sodium dodecyl sulfate) solution were measured in a rheometer (e.g., a Physica MCR101 rheometer, Anton PAAR, Ashland, Va., USA) equipped with a temperature control system (e.g., a model C-PTD200, Peltier, Ashland, Va., USA) and a high-pressure reaction cell (e.g., CC25/PR150, Ashland, Va., USA) (maximum temperature and pressure limits: 200° C. and 2000 psi) at a $CO_2$ pressure of 2000 psi (136 atm) (1.38E+04 kPa) and a temperature of 190° C. For the rheology measurement, the pressure cell (vol.=26 mL) was first preheated to 90° C. Water or a chemical solution (13 mL) was then introduced into the cell through a port and heated to a final temperature of 190° C. $CO_2$ was then introduced into the cell with an infusion pump (e.g., ISCO pump, Lincoln, Nebr. USA) in steps of about 100 psi (6.89 E+02 kPa) until the desired pressure was reached. Viscosity measurements were collected at a fixed shear rate of 100 $s^{-1}$. Rheology measurements for all mixtures were then collected for shear rate change selected from about 3 $s^{-1}$ to about 120 $s^{-1}$ at the selected temperature and pressure. Results are presented in FIGS. 5A-5F.

Example 2

NMR Analyses of PAA

Polyallylamine (Gelest Inc., Morrisville, Pa., USA) was prepared as a 1 wt % solution in deionized water and introduced into a High Pressure Magic Angle Spinning rotor (HP MAS rotors) as an exemplary gas-reactive compound for $^{13}C$ NMR chemical analysis. A rotor with a 7.5 mm O.D. and a 6.0 mm I.D. with a sample capacity of 450 μL was used equipped with a valve that allowed controlled exposure of an exemplary fracturing fluid of the present invention to pressurized gas. A 200 uL sample of a 1 wt % PAA solution was loaded into the rotor for $scCO_2$ exposure at 72° C. and 86.2 bar (1250 psi) (8.62E+03 kPa). NMR spectra were collected in situ at temperatures over the range from 72° C. to 154° C. regulated within a temperature controlled oven (±0.1° C.) (e.g., a DC-256 oven, Thermal Product Solutions, White Deer, Pa., USA) monitored by two thermocouples within the HP-MAS rotor reaction chamber. Pressures (±1 psi or ±6.89 kPa) were measured with transducers from a dual 250 mL syringe pump (e.g., Teledyne-ISCO-series D) pump cart. Background spectra were also collected of the empty MAS rotor and bulk $scCO_2$ at 150° C. and 120 bar (1.20E+04 kPa) prior to evaluating the PAA solution.

For NMR measurements, a high purity natural abundance $CO_2$ was mixed at a ratio of 1:9 with research grade 99% $^{13}C$ labeled $CO_2$ gas (Sigma-Aldrich/Isotech) to a net isotope enrichment of 10%. The $^{13}C$ labeled $CO_2$ was brought to a pressure of 1250 psi (86.2 bar) (8.62E+03 kPa) and equilibrated at 72° C. The 1 wt % PAA solution and the rotor valve were sealed under pressure after equilibration for 15 minutes, and then transferred to a spectrometer (e.g., a VNMRS 600 MHz SB NMR spectrometer, Agilent-Varian, Santa Clara, Calif., USA) equipped with an 89 mm bore 7.05 Tesla (T) magnet.

All the $^{13}C$ NMR measurements were performed on an Agilent-Varian 300 MHz VNMRS spectrometer at 75.4 MHz Larmor frequency using a double-resonance 7.5 mm MAS probe capable of 7.0 kHz maximum spinning frequency, in conjunction with a commercially available variable temperature (VT) stack. Using a solid-state $^{13}C$ NMR high-power decoupling single pulse (SP) experiment, all $^{13}C$ MAS spectra were collected with a spinning rate of 1.0 kHz, with a 2.0 psec $^{13}C$ pulse width, a 5 sec recycle delay. 120-1000 transients were accumulated over a temperature range of 72° C.-154° C. A power level for 1H decoupling of 31.2 kHz was selected, and a two-pulse phase modulation approach was employed during $^{13}C$ signal acquisition (300 msec). 15K real points were collected and zero filled to 64K points over a 50 kHz sweep width. Spectral apodization using a Lorentzian line broadening of 40 Hz and Gausssian function of 0.01 Hz was applied before Fourier transformation. Carbon (C) chemical shifts were referenced using adamatane (a cycloalkane, chemical formula $C_{10}H_{16}$) as an external reference (37.85 ppm).

Example 3

Effect of Temperature on Rheology of Expansion Polymer

Additional experiments on the reaction between PAA (polyallylamine) solution and $CO_2$ were conducted at internal temperatures ranging from approximately 60° C. to 400° C. and pressures between about 110 atm and about 300 atm to understand the effect of temperature on the rheology of the PAA solution during the reaction with $CO_2$. The high pressure cell was filled with 1 wt % PAA solution up to ~40-50% level in the window before introducing $CO_2$ at a range of external temperatures of 50° C., 100° C., 150° C., 200° C., 250° C., and 300° C., which correspond to the internal temperature of 58° C., 127° C., 196° C., 265° C., 333° C., and 402° C. based on the external and internal temperature calibration curve. Prior to $CO_2$ injection, internal pressure of the high pressure cell containing PAA solution was ~1 atm (1.01E+02 kPa) due to the presence of air and some water vapor at temperatures of 58° C.-196° C., and approximately 40 atm (4.05E+03 kPa), 70 atm (7.09E+03 kPa), and 150 atm (1.52E+04 kPa) (due to higher water vapor pressure) at temperatures of 265° C., 333° C., and 402° C., respectively. Volume expansion of PAA solution was nominal when $CO_2$ was first added to the high pressure cell at a $CO_2$ gas pressure of 110 atm (1.11E+04 kPa) at temperatures of 58° C. and 127° C., respectively. A solution of another amine-based polymer, polyacrylamide, expanded from ~40% level in the window to 100% level in the window when raising the pressure of $CO_2$ from 0 to 1500 psi (102.1 atm) (1.04E+04 kPa) at an experimental temperature of only 50° C.

As pressure of $CO_2$ increased up to 300 atm (3.04E+04 kPa), volume of PAA solution increased between from ~70% up to the 100% level depending on the temperature of the solution, as observed through the cell window. For example at an internal cell temperature of 196° C. and 265° C., the PAA solution showed an immediate increase in volume in the reaction cell from about 40% to about 70% immediately after injecting $CO_2$ at a gas pressure of 110 atm (1.12E+04 kPa). Expansion increased further to 80% level when $CO_2$ pressure was increased up to 300 atm (3.04E+04 kPa). At an internal temperature of 333° C., and a $CO_2$ pressure of ~110 atm (1.12E+04 kPa), expansion of the PAA fluid filled the window completely. At internal temperature of 402° C., volume of PAA solution increased immediately from ~40% to ~100% after injection of $CO_2$ at a gas pressure of 170 atm (1.72E+04 kPa), which immediately filled the cell window. Volume expansion was remained complete as $CO_2$ gas pressure increased up to 300 atm (3.04E+04 kPa).

At internal temperatures of 58° C.-265° C. and at pressures of 110 atm (1.12E+04 kPa), the PAA solution appeared to be a viscous liquid, exhibiting slow fluid movement. At an internal temperature of 333° C. and a gas pressure between 114 atm (1.16E+04 kPa) and 300 atm (3.04E+04 kPa), the PAA solution formed a gel that displayed minimal fluid movement. In addition, the PAA solution appeared less transparent at the listed temperature and pressure conditions, suggesting that it was not a liquid-phase fluid. At internal temperature of 402° C., the PAA appeared to act like a gel, exhibiting minimal fluid movement and low transparency at a $CO_2$ pressure above 200 atm (2.03E+04 kPa). However, the PAA behaved like a liquid with active fluid movement and transparency as the $CO_2$ pressure was lowered below 170 atm (1.72E+04 kPa). Results suggests the PAA solution transformed from a gel to a liquid when the $CO_2$ pressure was lower than 170 atm (1.72E+04 kPa) at 402° C. and back to a gel form when pressure was higher than 200 atm (2.03E+04 kPa) at 402° C., implying that $CO_2$ pressure can be a key to control the rheology of PAA solution at high pressure and/or temperature conditions.

Example 4

Rheology of Recycled PAA Solution

To determine whether the recycled PAA solution maintains the behavior of volume expansion and viscous gel formation, the PAA solution (initially 1 wt %) collected from the venting valve after the reaction with $CO_2$ at pressure up to 300 atm (3.04E+04 kPa) and internal temperature of ~330° C. was re-injected into the high pressure cell. The PAA solution was injected through the tubing connected to the back side of the cell, while $CO_2$ was injected through the tubing connected to the front side of the cell. Volume of the PAA solution (1 wt %) expanded from approximately 40% (as measured on the cell window) to 60% of the window immediately after $CO_2$ injection at 110 atm (1.12E+04 kPa), and to ~70% at the $CO_2$ pressure of 300 atm (3.04E+04 kPa). At the $CO_2$ pressure between 110 atm (1.12E+04 kPa) and 280 atm (2.84E+04 kPa), PAA formed a gel. After cooling the system to ~200° C., the reacted PAA solution was collected by opening the venting valve, and was re-injected into the high pressure cell and collected as a non-viscous fluid. Experiment was repeated two times. Volume of the recycled PAA solution again expanded following addition of $CO_2$ when the PAA solution was recycled.

Example 5

Viscosity of PAA-$CO_2$ Mixture

Compared to aqueous xanthan-$CO_2$ or aqueous SDS-$CO_2$ mixtures, the PAA-$CO_2$ mixture exhibited the highest viscosity and the best rheological performance under tested conditions. Viscosity was measured at shear rate of 100 $s^{-1}$ and temperature of 190° C. Viscosity of the deionized water-$CO_2$ mixture began to increase when pressure reached about 1100 psi (7.58E+03 kPa). Viscosity increased from ~1 cP to ~3 cP during the measurement. Viscosity of the PAA-$CO_2$, xanthan-$CO_2$, and SDS-$CO_2$ mixtures as a function of pressure and temperature at shear rate of 100 $s^{-1}$ are shown in FIGS. 5A-5C. Viscosity vs. shear rate of the mixtures at 130 atm (2000 psi) (1.32E+04 kPa) and 190° C. are shown in FIGS. 5D-5F. During the constant shear rate measurement, cell temperature was maintained at 190° C. Viscosity of the PAA-$CO_2$ mixture started to increase from ~1 cP to ~15 cP when the pressure reached 2000 psi (1.32E+04 kPa). Viscosity increased from ~3 cP and 7 cP for the xanthan-$CO_2$ mixture and the SDS-$CO_2$ mixture, respectively. All mixtures showed shear thinning behavior. At a shear rate of 10 $s^{-1}$, viscosity of the mixtures was about 170 cP, 45 cP, and 100 cP for the PAA, xanthan, and SDS mixture, respectively. For the PAA-$CO_2$ mixture, viscosity dropped from 178 cP at a 10 $s^{-1}$ shear rate to around 10 cP at a 120 $s^{-1}$ shear rate. Viscosity slowly increased when pressure reached ~120 atm (1.22E+04 kPa) and rapidly increased to 15 cP when pressure reached 130 atm (1.32E+04 kPa) (the pressure limit of the instrument) at 190° C. (the upper temperature limit of the instrument). Viscosity of the fracturing fluid of the present invention may increase with increasing temperature and/or pressure above these limits.

While preferred embodiments of the present invention have been shown and described, it will be apparent to those of ordinary skill in the art that many changes and modifications may be made without departing from the invention in its true scope and broader aspects. The appended claims are therefore intended to cover all such changes and modifications as fall within the spirit and scope of the invention.

What is claimed is:

1. A process for recovery of an energy-producing material from a subterranean reservoir, comprising the steps of:
    introducing a fluid comprising polyallylamine in an aqueous solvent into the subterranean reservoir to contact bedrock at a selected location or depth therein;
    introducing $CO_2$ gas or an activation compound that generates $CO_2$ gas; and
    reacting the fluid in the subterranean reservoir with the $CO_2$ gas to chemically expand the fluid volume therein, thereby exerting a fluid pressure in the bedrock above a minimum differential stress in-situ that propagates fractures and fissures therein to recover energy-producing materials therefrom.

2. The process of claim 1, wherein the fluid exerts a minimum differential pressure of at least about 1 bar (1.01E+02 kPa) above the fracture threshold to propagate the fractures and fissures in the bedrock.

3. The process of claim 1, wherein the expansion volume of the fluid is greater compared with the fluid volume absent the polyallylamine.

4. The process of claim 1, wherein recovering the energy-producing material from the reservoir includes changing the viscosity of the fluid in the reservoir.

5. The process of claim 1, wherein the fluid further includes a proppant comprising solid particles with a surface functionalized with a selected molecular weight of polyallylamine, wherein the solid particles comprise a material selected from the group consisting of: a ceramic, sand, bauxite, diorite, other natural minerals, other natural resin-coated minerals, and combinations thereof.

6. The process of claim 5, wherein the functionalized surface is in the form of an external liquid or solid shell that is hydrophilic, hydrophobic, or amphiphilic.

7. The process of claim 5, wherein the surface of the proppant is functionalized with a molecular weight of polyallylamine between about 30 Daltons to about 900,000 Daltons.

8. The process of claim 5, wherein the proppant comprising the polyallylamine includes a dispersibility in the reservoir up to about 50% greater than the proppant absent the polyallylamine.

9. The process of claim 5, wherein the proppant comprising the polyallylamine when contacted by the $CO_2$ gas in the reservoir releases and forms aggregates of the solid particles that keep fissures open in the reservoir.

10. The process of claim 5, wherein the proppant comprising the polyallylamine stabilizes fissure openings in the reservoir for up to about a year or more.

11. The process of claim 5, wherein the proppant comprising the polyallylamine, when contacted by the $CO_2$ gas, releases the polyallylamine, that chemically expands the fluid volume in the bedrock in-situ thereby propagating fractures and fissures therein for recovery of energy-producing materials therefrom.

* * * * *